United States Patent
Cocchi et al.

(10) Patent No.: US 9,826,752 B2
(45) Date of Patent: Nov. 28, 2017

(54) MACHINE AND METHOD FOR THE THERMAL TREATMENT OF LIQUID AND SEMI-LIQUID FOOD PRODUCTS

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.p.A.—CARPIGIANI GROUP, Milan (IT)

( * ) Notice: Subject to any disclaimer, the term of this patent is extended or adjusted under 35 U.S.C. 154(b) by 286 days.

(21) Appl. No.: 14/495,008

(22) Filed: Sep. 24, 2014

(65) Prior Publication Data
US 2015/0096322 A1    Apr. 9, 2015

(30) Foreign Application Priority Data
Oct. 7, 2013  (IT) .............................. BO2013A0551

(51) Int. Cl.
A23G 1/56        (2006.01)
F25B 30/02      (2006.01)
(Continued)

(52) U.S. Cl.
CPC ................ *A23G 1/56* (2013.01); *A23G 9/28* (2013.01); *A23G 9/281* (2013.01); *A23G 9/305* (2013.01);
(Continued)

(58) Field of Classification Search
CPC . A23G 1/56; A23G 9/08; A23G 9/305; A23G 9/28; A23L 3/36; A23L 3/16; F25B 30/02; F25D 31/005
See application file for complete search history.

(56) References Cited

U.S. PATENT DOCUMENTS

| | | | |
|---|---|---|---|
| 4,607,494 A | 8/1986 | Cipelletti | |
| 2007/0114228 A1* | 5/2007 | Cocchi | A23G 9/08 219/679 |

(Continued)

FOREIGN PATENT DOCUMENTS

| | | |
|---|---|---|
| EP | 0 059 329 A2 | 9/1982 |
| EP | 0 059 330 A2 | 9/1982 |

(Continued)

OTHER PUBLICATIONS

Search Report for corresponding Italian Patent Application No. BO2013A 000551 dated Jun. 4, 2014.

*Primary Examiner* — Emmanuel Duke
(74) *Attorney, Agent, or Firm* — Renner, Otto, Boisselle & Sklar, LLP

(57) ABSTRACT

A machine for the thermal treatment of liquid and semi-liquid food products includes at least two tanks for containing respective products to be subjected to the thermal treatment, at least one dispenser for dispensing the product contained in said tanks, at least one stirrer mounted inside each tank for mixing the product contained therein, and thermal treatment means operatively acting on the products contained in the containers. The thermal treatment means includes at least one circuit for circulation of an operating fluid and two first heat exchangers operating according to a thermodynamic cycle; each of the two heat exchangers being associated with a respective tank. The thermal treatment means is configured to implement at least one operating mode of removing heat from the respective tank by one heat exchanger and simultaneously transferring heat to the respective tank by the other heat exchanger.

13 Claims, 8 Drawing Sheets

(51) Int. Cl.
*A23G 9/28* (2006.01)
*F25D 31/00* (2006.01)
*A23L 3/16* (2006.01)
*A23L 3/36* (2006.01)
*A23G 9/30* (2006.01)

(52) U.S. Cl.
CPC ...... *A23L 3/16* (2013.01); *A23L 3/36* (2013.01); *F25B 30/02* (2013.01); *F25D 31/005* (2013.01)

(56) References Cited

U.S. PATENT DOCUMENTS

| | | | |
|---|---|---|---|
| 2009/0293508 A1* | 12/2009 | Rafalovich | F25C 5/005 62/66 |
| 2010/0263400 A1* | 10/2010 | Tachibana | B01D 61/025 62/389 |
| 2012/0104046 A1* | 5/2012 | Wadle | A23G 9/12 62/342 |

FOREIGN PATENT DOCUMENTS

| | | | | |
|---|---|---|---|---|
| EP | 0 496 441 A1 | 7/1992 | | |
| EP | 1 980 156 A1 | 10/2008 | | |
| EP | 2 084 971 A2 | 8/2009 | | |
| GB | 749 244 A | 5/1956 | | |
| GB | 2 062 829 A | 5/1981 | | |
| IT | EP 0059329 A2 * | 9/1982 | | A23G 9/08 |

* cited by examiner

MACHINE AND METHOD FOR THE THERMAL TREATMENT OF LIQUID AND SEMI-LIQUID FOOD PRODUCTS

This application claims priority of Italian Patent Application No. BO2012A 000551 filed Oct. 7, 2013, which is hereby incorporated herein by reference.

BACKGROUND OF THE INVENTION

This invention relates to a machine and a method for the thermal treatment and production of liquid and semi-liquid food products.

More specifically, this invention relates to machines for the thermal treatment of food products such as ice creams, whipped cream, creams, chocolate, yogurt, granita and the like.

Machines of this kind are, for example and not only, machines known as "pasteurizers", capable of mixing, cooking, pasteurizing, homogenizing, cooling, aging and storing under perfect conditions of hygiene, diverse specialty foods of the patisserie, ice cream and gourmet sectors.

Generally speaking, these machines comprise a tank for containing the product to be subjected to the thermal treatment, at least one dispenser tap mounted at the bottom of the front of the tank and a stirrer mounted inside the tank for mixing the product.

According to known methods, the thermal treatment is generally performed by means of electrical resistors and/or a heating system based on a thermodynamic cycle.

Some machines of this type are equipped with two or more tanks, each used to treat the product inside it.

In these machines, however, which will hereinafter be called "multiple tank" machines, the thermal treatment (heating/cooling) means are limited in their operational versatility.

The limited operational versatility of prior art thermal treatment means on the one hand limits the variety of products obtainable from the same machine and, on the other, does not allow very different products to be made simultaneously, in particular cold products in one tank and hot products in another tank (for example, ice cream and hot chocolate).

Generally speaking, therefore, machines of the above mentioned type are divided into two categories: those for making cold products and those for making hot products.

SUMMARY OF THE INVENTION

This invention has for an aim to overcome the above mentioned disadvantages.

More specifically, one aim of the invention is to provide a machine for the thermal treatment of liquid and semi-liquid food products which is capable of making a larger variety of products than was possible in the prior art.

A further aim of the invention is to provide a machine for the thermal treatment of liquid and semi-liquid food products which is capable of making very different products simultaneously, and in particular, in the case of a "multiple tank" machine, cold products in one tank and hot products in another tank.

According to the invention, these aims are achieved by a machine for the thermal treatment of liquid and semi-liquid food products comprising the technical features described in one or more of the appended claims.

More specifically, the above aims are achieved by a machine for the thermal treatment of liquid and semi-liquid food products comprising:
- at least two containers for containing two respective products (one "hot", which needs to be heated, that is, to receive heat, in order to be made, and the other cold, which needs to be cooled, that is, to be deprived of heat) to be subjected to the thermal treatment,
- at least one dispenser for dispensing the product contained in the containers,
- thermal treatment means operatively acting on the products contained in the containers.

The thermal treatment means comprise at least one circuit for circulation of a fluid and at least two first heat exchangers operating according to a thermodynamic cycle; each of the two first heat exchangers being associated with a respective container; said thermal treatment means being configured in such a way that one of the exchangers heats the contents of at least one of the containers, for producing a first product, and the other of the exchangers cools the contents of the other of the containers, for producing a second product.

It should be noted that according to the invention, the machine allows making a hot product and a cold product which can be subsequently used together or independently of each other.

It should be noted that the exchangers may be served by the same fluid circulation circuit or may have different circulation circuits.

Moreover, the exchangers may be configured to operate simultaneously or alternatively.

BRIEF DESCRIPTION OF THE DRAWINGS

The technical features of the invention, with reference to the above aims, are clearly described in the claims below and its advantages are more apparent from the detailed description which follows, with reference to the accompanying drawings which illustrate a preferred, non-limiting embodiment of the invention by way of example and in which:

DESCRIPTION OF THE PREFERRED EMBODIMENTS

Figure 1:
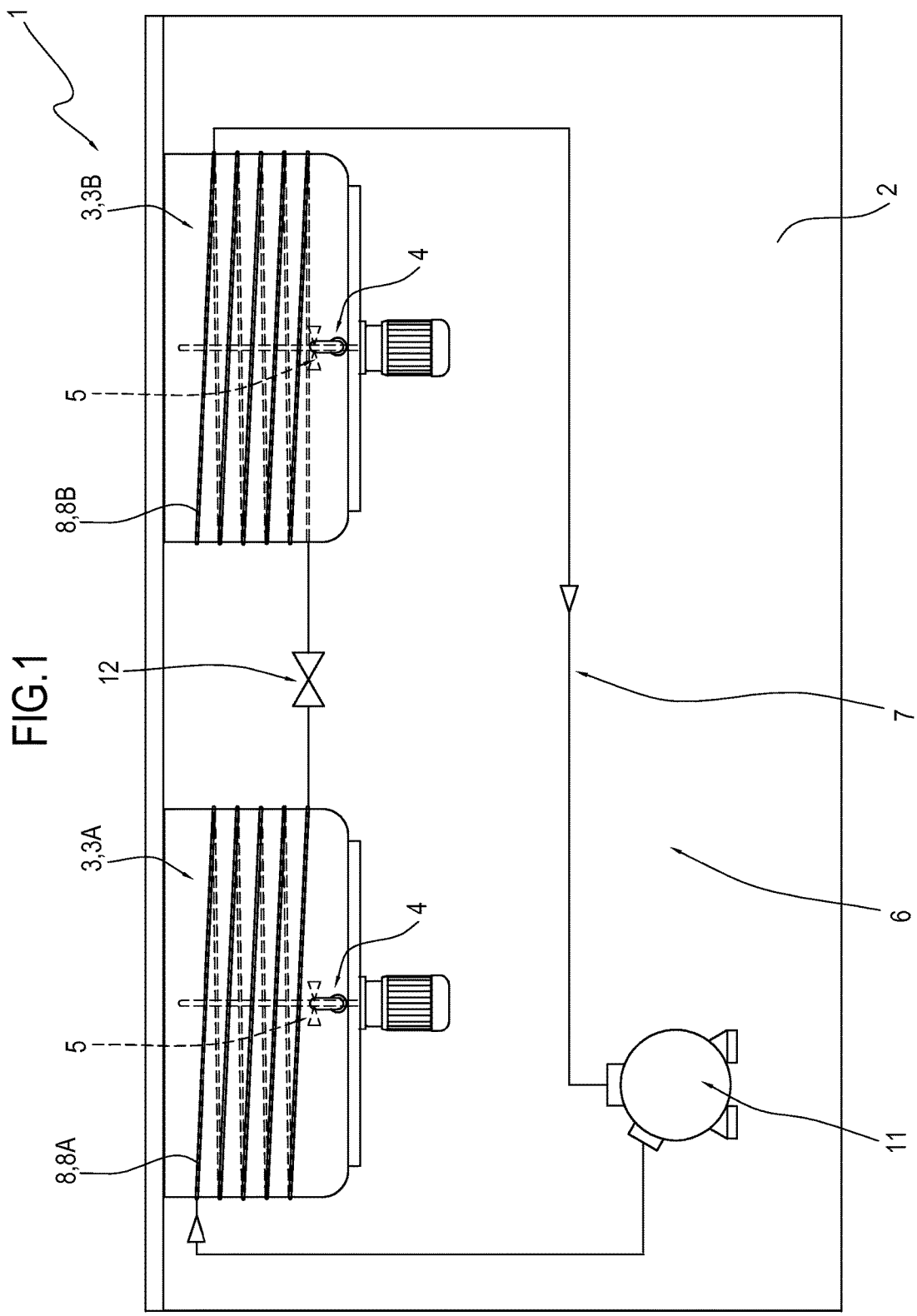
FIG. 1 schematically illustrates a first embodiment of the machine according to the invention.

With reference to the accompanying drawings, the numeral 1 denotes in its entirety a machine for the thermal treatment of liquid and semi-liquid food products.

Preferably, the food products treated by the machine 1 may be ice creams, whipped cream, creams, chocolate, yogurt or similar products.

More specifically, the machine 1 is capable of simultaneously treating "hot" products (for example, chocolate) and "cold" products (for example, ice cream).

The machine 1 comprises a frame 2 on which are mounted at least two containers (3A,3B) for containing respective products to be subjected to the thermal treatment. Although reference to two containers 3 is made in this specification and in the accompanying drawings, the machine 1 may also comprise more than two tanks 3 without departing form the spirit of the invention.

It should be noted that each container (3A,3B) may be a tank or a process cylinder (which can be sealed off from the outside).

Figure 5:
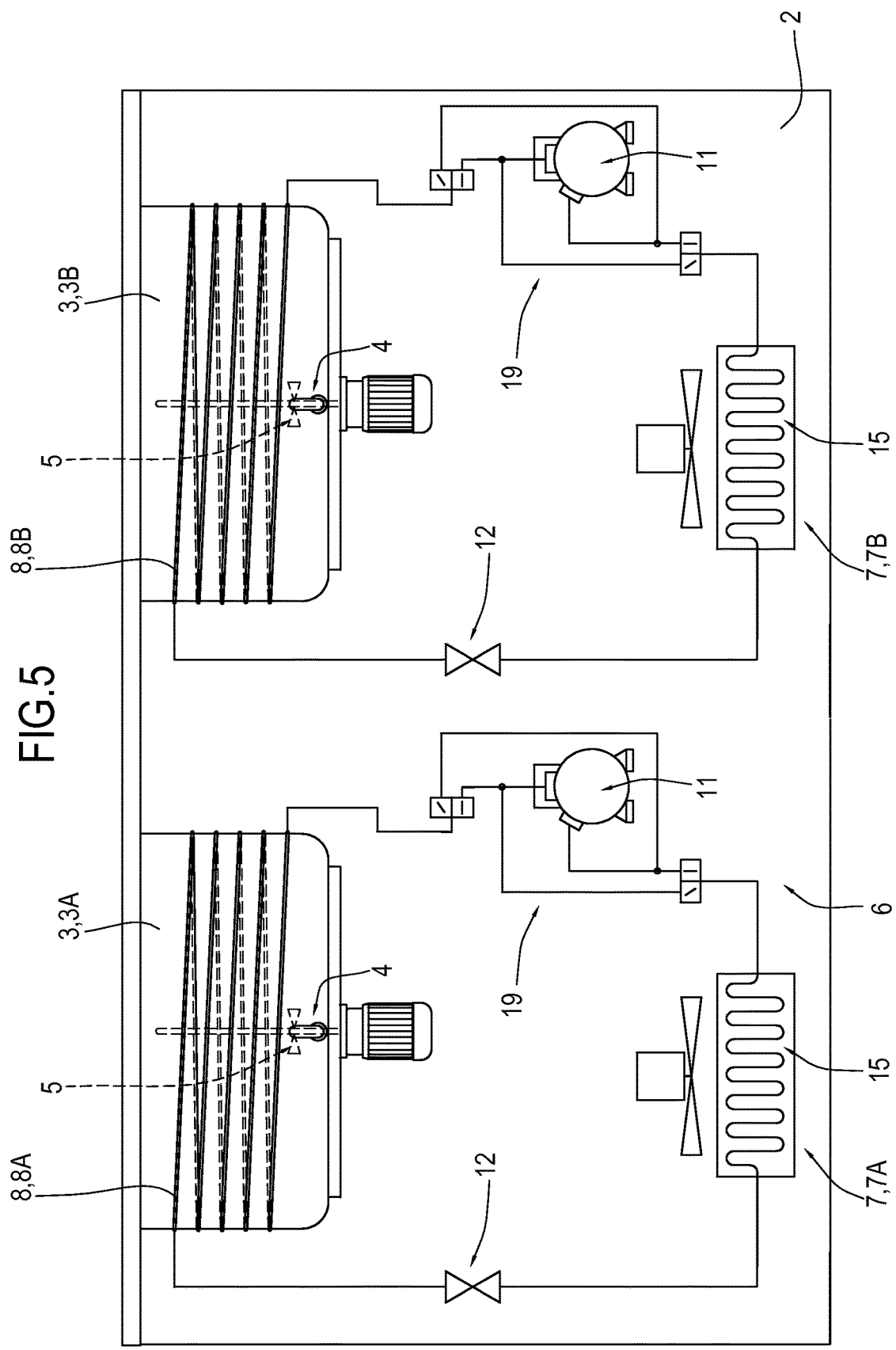
FIG. 5 schematically illustrates a fifth embodiment of the machine according to the invention.
Figure 6:
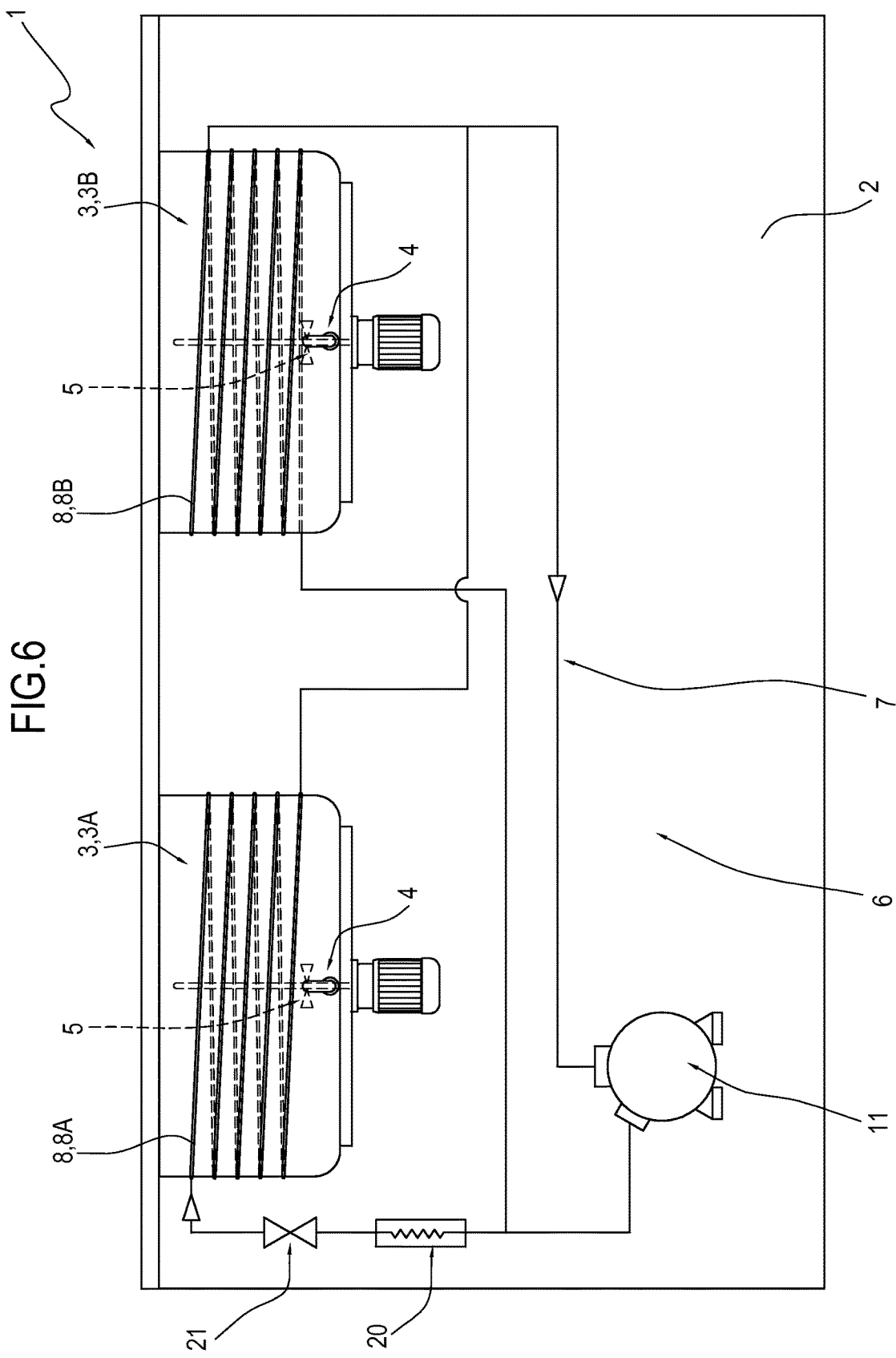
FIG. 6 schematically illustrates a sixth embodiment of the machine according to the invention.
Figure 7:
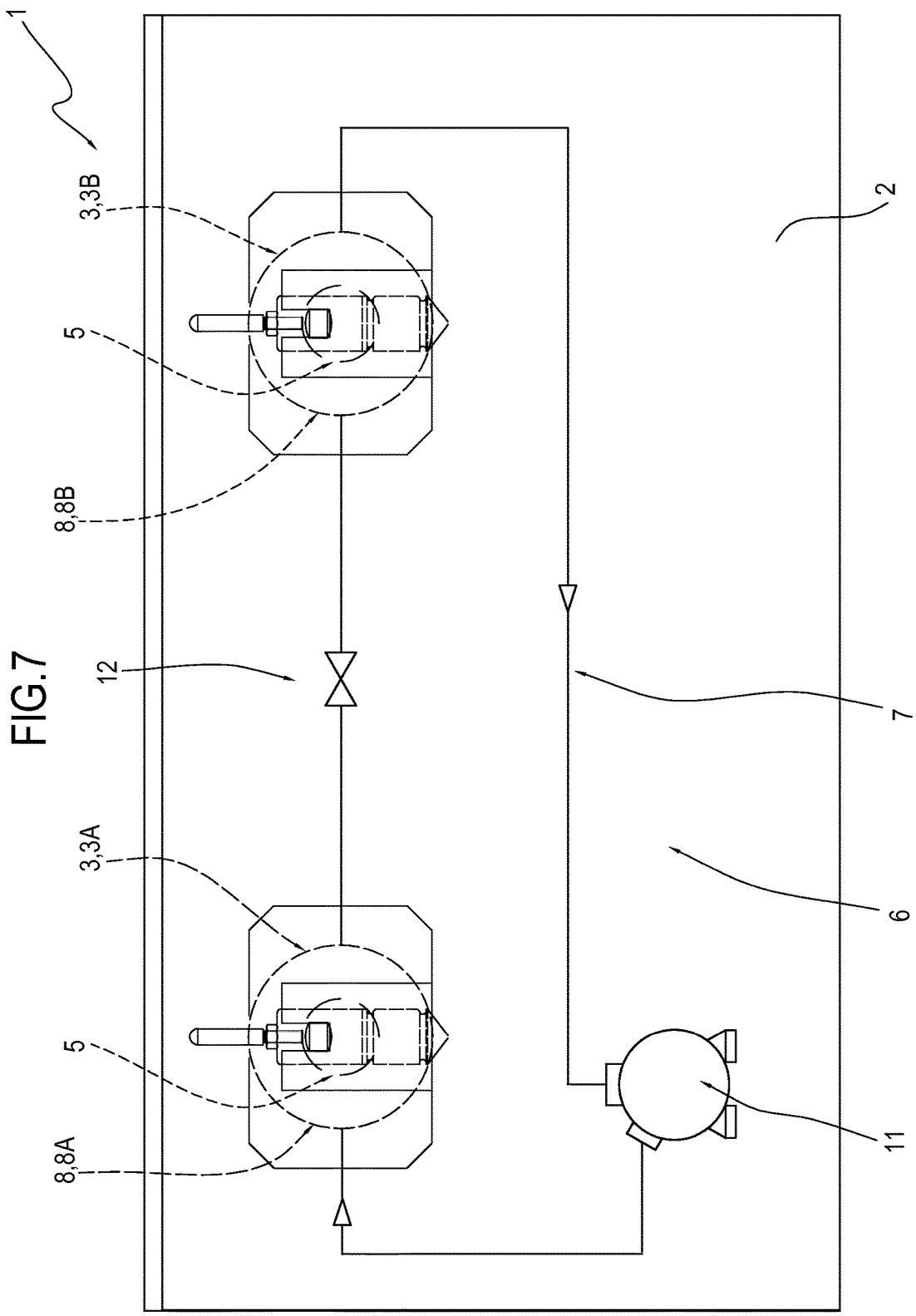
FIG. 7 illustrates a variant of the machine of FIG. 1.

FIGS. 1 to 6 show a machine 1 equipped with tanks, whilst the machine 1 shown in FIG. 7 is equipped with process cylinders (which can be filled with product in different ways).

It should be noted, therefore, that according to the invention, each of the two containers (3A,3B) may be a tank or a process cylinder.

This specification describes mainly the machine 1 with a tank 3: the description is, however, also applicable to a machine 1 with a process cylinder instead of the tank.

Each tank 3 is preferably equipped, in known manner not illustrated in detail here, with at least one tap 4 (or more generally speaking, with a dispenser 4) mounted at the bottom of its front wall and used to dispense the product contained inside the tank 3 itself.

More generally speaking, the tap 4 constitutes dispensing means associated with the tank 3.

Each tank 3 may also be equipped, in known manner not illustrated in detail here, with at least one power-driven stirrer 5 mounted inside it to mix the product contained in the tank 3.

The stirrer is configured to mix the product and, in some applications, to scrape the cooling wall.

The machine 1 also comprises thermal treatment means 6 housed at least partly inside the frame 2 and operatively acting on the products contained inside the tanks 3.

According to one feature of the invention, the thermal treatment means 6 comprise at least one circuit 7 for circulation of an operating fluid (preferably a refrigerant fluid) and at least two first heat exchangers 8 operating according to a thermodynamic cycle;

Each of the two first heat exchangers 8 is associated with a respective tank 3.

More specifically, the first heat exchangers 8 are defined by coils wound around the side walls of the respective tanks 3 to exchange heat with the products through the side walls of the tanks 3 themselves.

The thermal treatment means 6 have at least one operating mode where heat is removed from one of the two products being treated by one first heat exchanger 8 and (simultaneously) heat is transferred to the other of the two products being treated by the other first heat exchanger 8.

Figure 3:
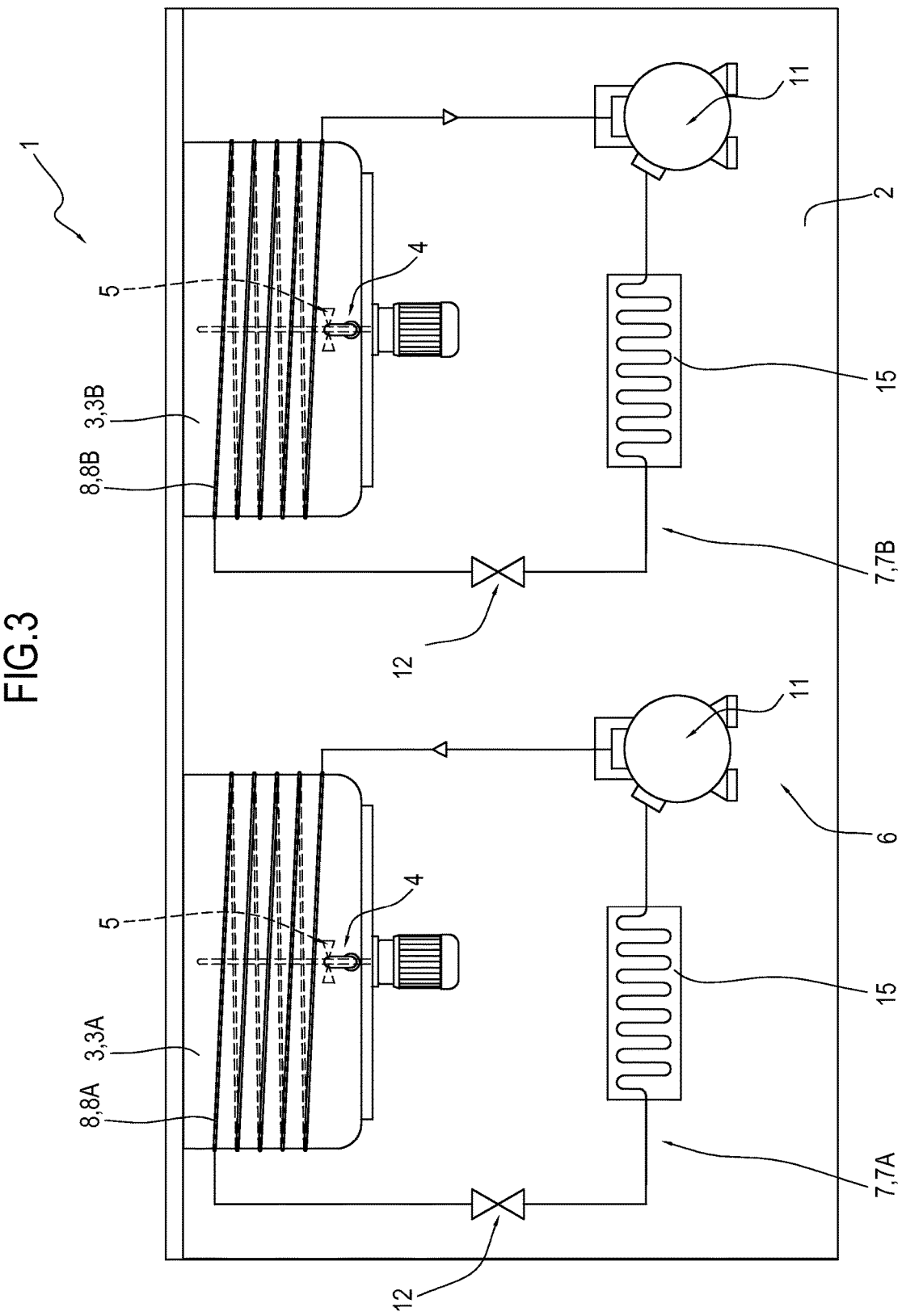
FIG. 3 schematically illustrates a third embodiment of the machine according to the invention.
Figure 4:
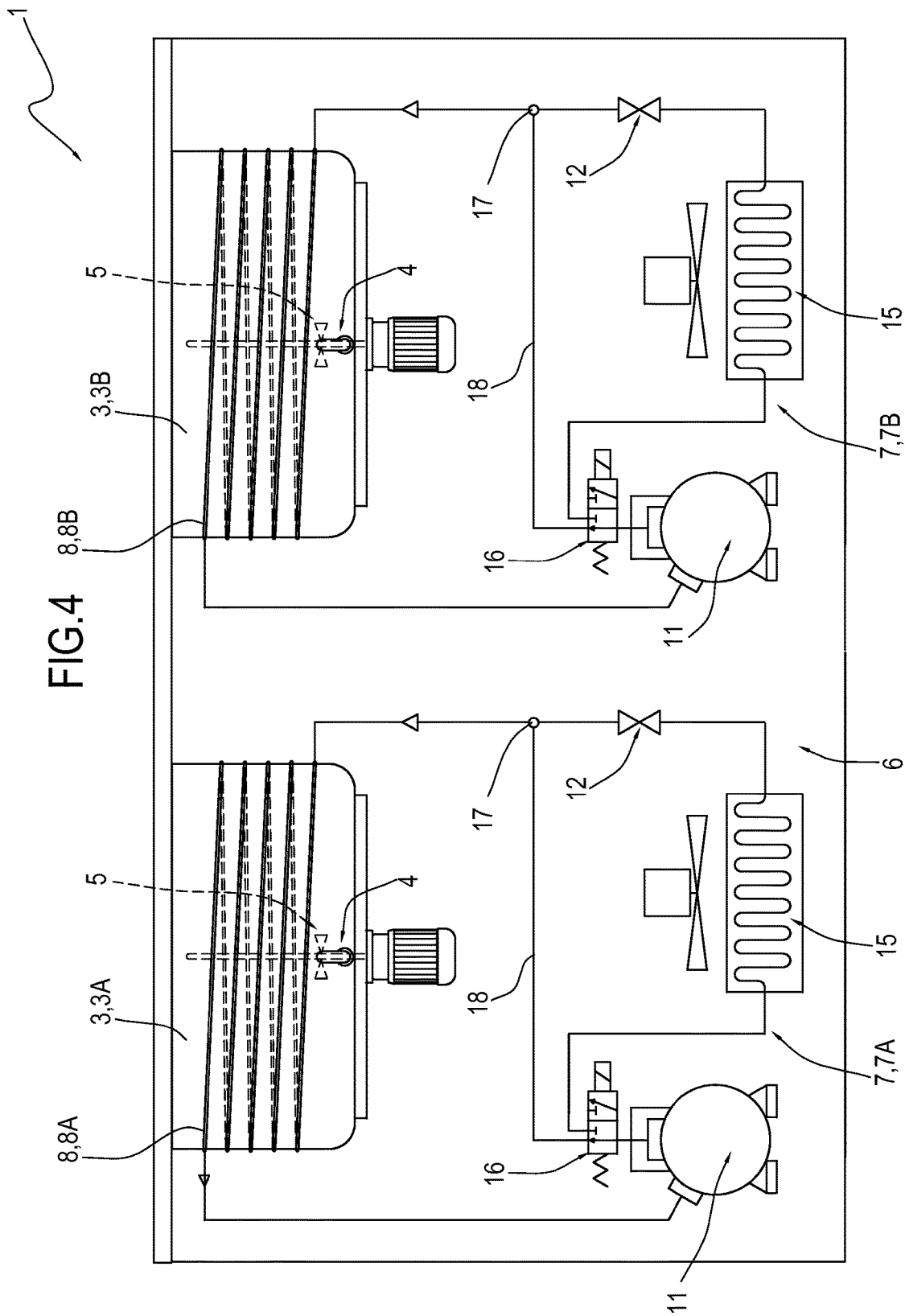
FIG. 4 schematically illustrates a fourth embodiment of the machine according to the invention.

It should be noted that the heat removed from one of the products being treated is not necessarily the heat transferred to the other of the products being treated (in this regard, FIGS. 3 to 5 illustrate embodiments where the heat removed from one of the products being treated is not transferred to the other of the products being treated).

In other words, the machine 1 is capable of working and/or treating and/or making simultaneously in the two tanks 3 products which are very different from each other, and in particular, cold products in one tank 3 and hot products in the other tank 3.

In different variant embodiments, illustrated separately with reference to respective accompanying drawings, the thermal treatment means 6 may have additional operating modes, in particular whereby heat is removed simultaneously by both of the first heat exchangers 8 or simultaneously given off by both of the first heat exchangers 8. Further, each heat exchanger 8 may be selectively switched on or off to remove heat from, or transfer heat to, the respective tank 3.

In the embodiment of FIG. 1, there is a single operating fluid circulation circuit 7 in which the two first heat exchangers (8A,8B, also labeled 8)—associated with the two tanks 3A and 3B, respectively—are connected in series.

The circuit 7 includes a compressor 11 and a throttle valve 12 to obtain a thermodynamic cycle in known manner.

More specifically, the first heat exchanger 8A located downstream of the compressor 11, that is, connected to the delivery terminal of the compressor 11, cools (condenses) the fluid circulating in the circuit 7 in such a way as to heat the product in the respective tank 3A (the tank 3A on the left in FIG. 1).

The first heat exchanger 8B located upstream of the compressor 11, that is, connected to the return terminal of the compressor 11, heats (evaporates) the fluid circulating in the circuit 7 in such a way as to cool the product in the respective tank 3B (the tank 3 on the right in FIG. 1).

In other words, the machine 1 is capable of working and/or treating and/or making simultaneously a cold product in one tank 3B and a hot product in the other tank 3A.

It should be noted, therefore, that in the embodiment illustrated, the machine 1 comprises a single circuit 7 for circulation of the operating fluid and the first heat exchangers (8A,8B) associated with the respective two tanks are defined by the condenser and by the evaporator of the circuit 7 for circulation of the operating fluid.

Figure 2:
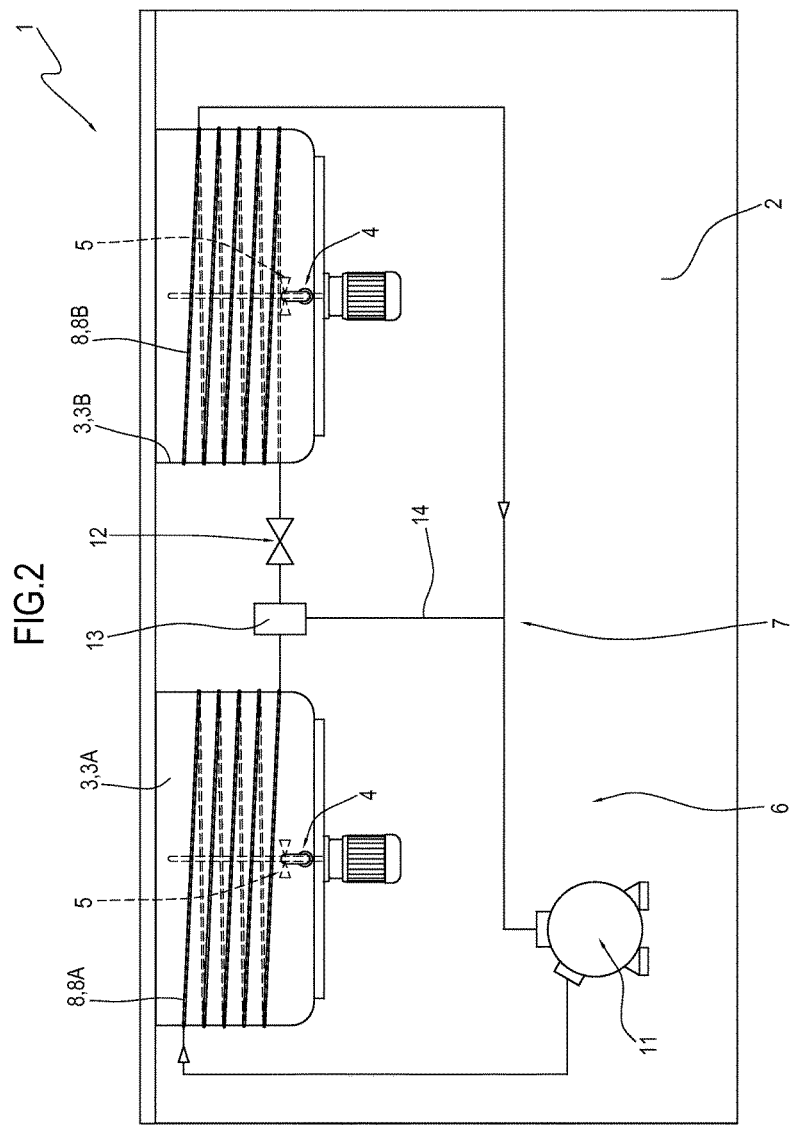
FIG. 2 schematically illustrates a second embodiment of the machine according to the invention.

The embodiment shown in FIG. 2 is a variant of the one described with reference to FIG. 1.

In this case, the circuit 7 further comprises a switching valve 13 interposed between the two first heat exchangers 8A,8B, and a by-pass branch 14, interposed between the switching valve 13 and the compressor 11.

It should be noted that the by-pass branch 14 is configured to allow the operating fluid to circulate between the compressor 11 and the first exchanger 8A.

More specifically, the switching valve 13 is positioned downstream of the first heat exchanger 8 which is connected to the delivery terminal of the compressor 11 and is positioned upstream of the throttling valve 12.

The switching valve 13 can be controlled by the operator for changing the configuration of the circuit 7.

Operatively, if the switching valve 13 is in a first position where the by-pass branch 14 is closed and the connection between the two first heat exchangers 8 is open, the machine 1 operates in the manner described with reference to FIG. 1.

On the other hand, if the switching valve 13 is switched to a second position where the by-pass branch 14 is open and the connection between the two first heat exchangers 8 is closed, the throttling valve 12 and the first heat exchanger 8B which is located downstream of the throttling valve 12 are cut off from fluid circulation while the first heat exchanger 8A which is connected to the delivery terminal of the compressor 11 has fluid flowing through it and transfers heat to the respective tank 3A, thereby heating the product contained therein.

In this case, the fluid circulating in the circuit 7 is heated at the compressor 11, where heat is generated by the very effect of its operation (heat generated by friction between the parts of the compressor 11 and by the Joule effect in the electric motor of the compressor 11 itself) and transfers heat to the product in the tank 3A associated with the first heat exchanger 8A which has fluid flowing through it.

In this case, therefore, the machine 1 is capable of working and/or treating and/or making simultaneously a cold product in one tank 3 and a hot product in the other tank 3 or, depending on the different configuration obtainable by switching as described above, of working and/or treating and/or making simultaneously a hot product in one tank 3A while the other tank 3B is left idle.

In the embodiments shown in FIGS. 3, 4 and 5, the machine 1 comprises two circuits 7 (labeled individually 7A and 7B) for circulation of the operating fluid, which are distinct and independent of each other and in which the first heat exchangers 8 are respectively integrated.

Preferably, the two fluid circulation circuits (7A,7B) have the same configuration, that is to say, they are constructionally identical, although they work or can work, depending on the different embodiments described below, according to different operating modes. In the embodiment shown in FIG. 3, each operating fluid circulation circuit (7A,7B) comprises a compressor 11, a first heat exchanger 8, a second heat exchanger 15, and a throttling valve 12, operating according to a thermodynamic cycle.

The first heat exchanger 8 is associated with a respective tank 3. More specifically, the first heat exchanger 8 is defined by a coil wound around the side walls of the respective tank 3 to exchange heat with the product contained therein.

In one of the two fluid circulation circuits 7—the circuit 7A shown on the left in FIG. 3—the first heat exchanger 8A acts as a condenser and the second heat exchanger 15 acts as an evaporator, whilst in the other fluid circulation circuit 7B—the one shown on the right in FIG. 3—the first heat exchanger 8B acts as an evaporator and the second heat exchanger 15 acts as a condenser.

In other words, in this configuration, the machine 1 is capable of working and/or treating and/or making simultaneously a cold product in one tank 3B and a hot product in the other tank 3A.

It should also be noted that according to the embodiment illustrated in FIG. 3, the operating fluid circulation circuit 7B performs a cooling cycle while the circuit 7A acts as a "heat pump".

In the embodiment of FIG. 4, there are two operating fluid circulation circuits (7A, 7B), which are distinct and separate from each other.

Each operating fluid circulation circuits (7A, 7B) is associated with one of the two tanks (3A,3B).

Preferably, the two operating fluid circulation circuits (7A, 7B) are identical.

Each operating fluid circulation circuit (7A,7B) comprises a compressor 11, a first heat exchanger 8, a second heat exchanger 15, and a throttling valve 12, operating according to a thermodynamic cycle. More precisely, the second heat exchanger 15 leads to the delivery terminal of the compressor 11 and is connected to the first heat exchanger 8 through the throttling valve 12.

The first heat exchanger 8 is associated with a respective tank 3.

More specifically, the first heat exchanger 8 is defined by a coil wound around the side walls of the respective tank 3 to exchange heat with the product contained therein.

Each fluid circulation circuit 7 further comprises a switching valve 16 which is located downstream of the delivery terminal of the compressor 11 and whose output is connected both to the second heat exchanger 15, at a first switching position of it, and to a node 17 interposed between the throttling valve 12 and the first heat exchanger 8, at a second switching position of it.

The connection between the switching valve 16 and the node 17 is made by a by-pass branch 18.

The switching valve 16 can be controlled by the operator for changing the configuration of the circuit (7A,7B).

Operatively, if the switching valve 16 is in its first position, where the by-pass branch 18 is closed and the connection between the compressor 11 and the second heat exchanger 15 is open, the operating mode of the single fluid circulation circuit 7 is the one whereby the first heat exchanger 8 acts as an evaporator and the second heat exchanger 15 acts as a condenser. Thus, the product in the tank 3 is cooled: that means the product treated in the tank 3 is a "cold" product.

On the other hand, if the switching valve 16 is in its second position, where the by-pass branch 18 is open and the connection between the compressor 11 and the second heat exchanger 15 is closed, the operating mode of the single fluid circulation circuit 7 is the one whereby the throttling valve 12 and the second heat exchanger 15 are cut off from fluid circulation, while the first heat exchanger 8 has fluid flowing through it and transfers heat to the respective tank 3, thereby heating the product contained therein.

In this case, the fluid circulating in the circuit 7 is heated at the compressor 11, where heat is generated by the very effect of its operation (heat generated by friction between the parts of the compressor 11 and by the Joule effect in the electric motor of the compressor 11 itself) and transfers heat to the product in the tank 3 associated with the first heat exchanger 8 which has fluid flowing through it.

That means the product treated in the tank 3 is a "hot" product.

In this case, therefore, thanks to the two tanks and to the configuration of the thermal treatment means 6, the machine 1 is capable of working and/or treating and/or making simultaneously and independently of each other a cold or hot product in one tank 3 and a cold or hot product in the other tank 3. In the embodiment shown in FIG. 5, each fluid circulation circuit (7A,7B) comprises a compressor 11, a first heat exchanger 8, a second heat exchanger 15, and a throttling valve 12, operating according to a thermodynamic cycle.

More precisely, the second heat exchanger 15 is connected to the first heat exchanger 8 through the throttling valve 12.

The first heat exchanger 8 is associated with a respective tank 3.

More specifically, the first heat exchanger 8 is defined by a coil wound around the side walls of the respective tank 3 to exchange heat with the product contained therein.

Each fluid circulation circuit (7A,7B) further comprises a valve 19 for inversion of the thermodynamic cycle between a first configuration, in which the first heat exchanger 8 acts as an evaporator and the second heat exchanger 15 acts as a condenser, and a second configuration, in which the first heat exchanger 8 acts as a condenser and the second heat exchanger 15 acts as an evaporator.

In other words, each operating fluid circulation circuit (7A,7B) can be controlled by the operator to operate, independently of the other fluid circulation circuit (7A,7B), in cooling or heat pump mode.

The cycle inversion valve 19 is of known type and therefore not described in detail, and can be controlled by the operator.

In this case, too, the machine 1 is capable of working and/or treating and/or making simultaneously and independently of each other a cold or hot product in one tank 3 and a cold or hot product in the other tank 3.

FIG. 6 illustrates an embodiment of the machine 1 with a single compressor 11.

It should be noted that in this embodiment, the product in the tank 3A is cooled, while the product in the tank 3B is heated.

Figure 8:
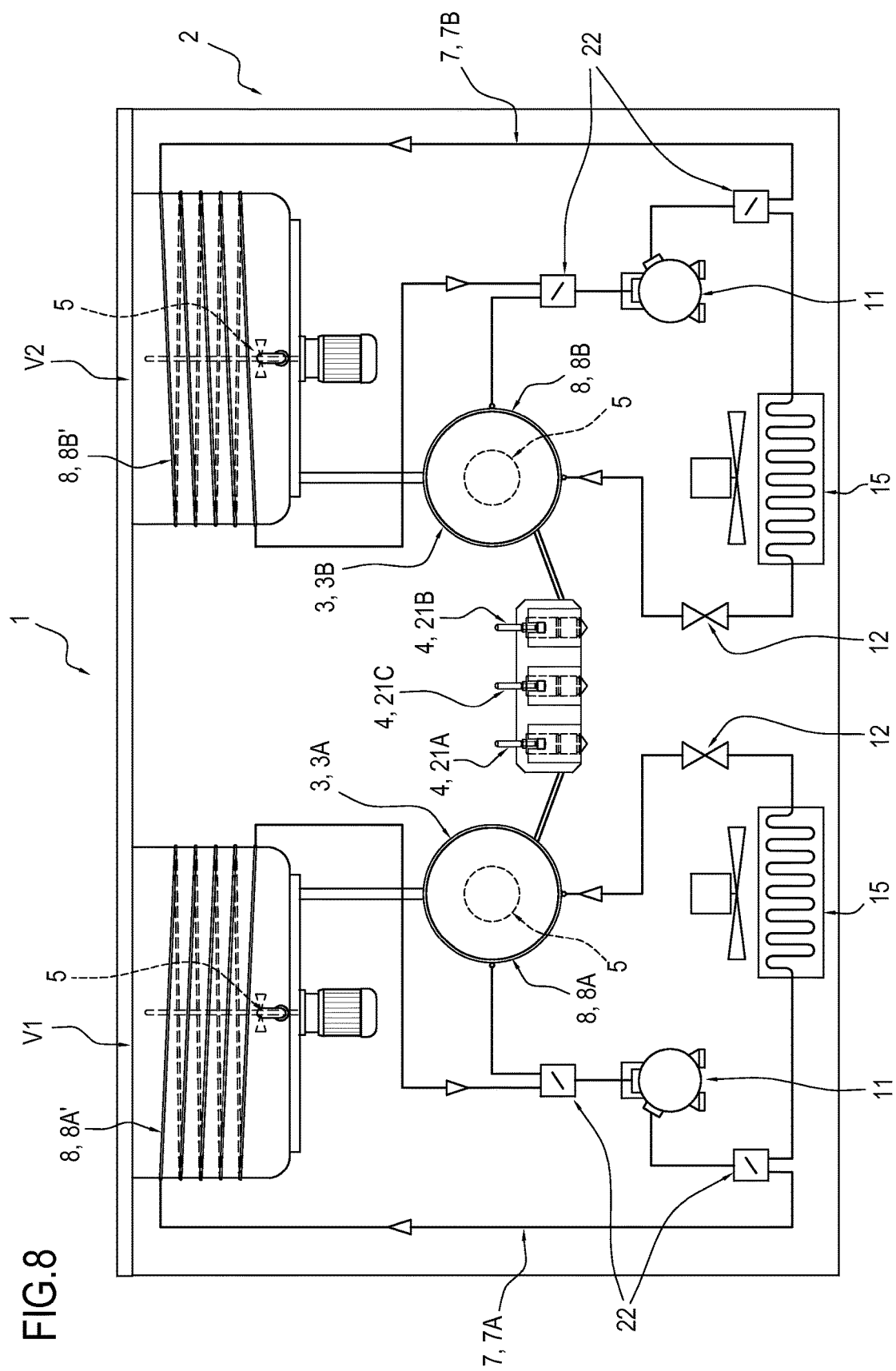
FIG. 8 illustrates a further variant of the machine of the preceding figures.

As schematically illustrated in FIG. 8, the machine 1 can cool the product in the tank 3A or heat the product in the tank 3B.

It should be noted, therefore, that the operating fluid is selectively (alternatively) made to flow through the heat exchanger 8A, operating according to a cooling thermal cycle, or through the heat exchanger 8B, operating according to what is known as a hot-gas thermal cycle.

More specifically, in FIG. 6, the numeral 20 denotes a heat exchanger (designed to give off heat) and the numeral 21 a pressure reducing valve, which are used when the operating fluid is made to flow through the exchanger 8A. It should be noted, therefore, that the machine 1 comprises switching means (not illustrated and preferably in the form of one or more switching valves) operating on the fluid circulation circuit 7 to allow the user to switch the path of the fluid in one of the above mentioned paths, that is to say, through the exchanger 8A or through the exchanger 8B.

According to this embodiment, the fluid circulation circuit 7 is configured in such a way as to define two fluid circulation paths, one through the heat exchanger 8A and another through the heat exchanger 8B.

These paths share the portion of the fluid circulation circuit 7 which has the compressor 11 in it.

Advantageously, the machine 1 allows heating/cooling the products in the two tanks (3A,3B) by means of a single compressor 11, with obvious advantages in terms of installation, cost, and structural simplicity of the machine 1.

FIG. 8 illustrates a further variant embodiment of the machine of FIG. 1 in a front view.

It should be noted that this machine 1 comprises a first cylinder 3A for processing a first product and a second cylinder 3B for processing a second product.

In this regard, it should be noted that the machine 1 preferably comprises a first dispenser 21A connected to the first cylinder 3A, to allow dispensing the first product from the first cylinder, a second dispenser 21B to allow dispensing the second product from the second cylinder 3B and a third dispenser 21C to allow dispensing and mixing the products from both of the cylinders 3A and 3B.

It should be noted that in the example illustrated in FIG. 8, there are also two tanks V1 and V2, connected to the first and the second cylinder 3A and 3B, respectively.

The tanks V1 and V2 define tanks for feeding the respective cylinders (3A,3B) and allow a first thermal treatment to be performed on the product.

In this regard, the machine 1 of FIG. 8 comprises a thermal treatment plant 7A, which thermally treats the product inside the tank V1 and the first cylinder 3A, and a second thermal treatment plant 7B, which thermally treats the product inside the tank V2 and the second cylinder 3B.

It should be observed in this regard that, with reference to each of the two aforementioned thermal treatment plants (7A; 7B), the thermal treatment plant (7A; 7B) is configured to cool the cylinder (3A; 3B) or to heat the tank (V1,V2).

More specifically, the thermal treatment plant (7A; 7B) is configured to work in a first mode/configuration to thermally treat the cylinder (3A; 3B) and in a second mode/configuration to thermally treat the tank (V1; V2).

It should be noted that in the second mode/configuration, the thermal treatment plant (7A; 7B) performs what is known as a hot-gas thermal cycle.

A machine 1 according to this embodiment is, advantageously, capable of treating and making two different types of products and dispensing a mixture of the products. As may be observed in FIG. 8, the machine 1 comprises a heat exchanger associated with each cylinder (3A,3B), labeled 8A and 8B for the first and the second cylinder (3A,3B), respectively, and a heat exchanger associated with each tank (V1,V2), labeled 8A' and 8B' for the first and the second tank (V1,V2), respectively.

These heat exchangers (8A and 8B, 8A' and 8B') are associated with the first and the second thermal treatment circuit (7A,7B), respectively.

In the embodiment of FIG. 8, the machine 1 comprises a first compressor 11, associated with the first thermal treatment plant 7A and a second compressor 11 associated with the second thermal treatment plant 7B.

It should also be noted that in the embodiment illustrated in FIG. 8, each fluid circulation circuit (7A,7B) comprises switching means 22, configured to make the fluid circulate in the tank (V1, V2) or in the cylinder (3A,3B), alternatively, so as to thermally treat the product in the tank (V1, V2) or in the cylinder (3A,3B).

According to another aspect, the operating fluid circulation circuit 7 is configured to allow inversion (selection) of the direction of movement of the operating fluid, to allow heating one of the containers (3A; 3B) when the fluid is moved in a first direction and to allow cooling one of the containers (3A; 3B) when the fluid is moved in a second direction which is opposite to the first.

Also defined according to the invention is a method for the thermal treatment of liquid and semi-liquid food products.

The method comprises the following steps:
preparing at least two tanks (3A,3B) for containing respective base products to be subjected to the thermal treatment;
stirring the product placed inside each tank (3A,3B) in order to mix the product contained therein (optional step);
thermally treating the product inside the two tanks (3A, 3B) simultaneously by removing heat from one (3A) of the two tanks (3A,3B) and simultaneously transferring heat to the respective other tank (3B).

According to a first embodiment, the steps of removing heat from one of the two tanks (3A,3B) and simultaneously transferring heat to the respective other tank (3B) are accomplished by exchanging heat with an operating fluid circulating in the same circulation circuit 7 (FIGS. 1 and 2).

According to a second embodiment, the steps of removing heat from one of the two tanks (3A,3B) and simultaneously transferring heat to the respective other tank (3B) are accomplished by exchanging heat with an operating fluid circulating in two circulation circuits (7A,7B) which are distinct and separate from each other (FIGS. 3 to 5).

The invention described above is susceptible of industrial application. It can be modified and adapted in several ways without thereby departing from the scope of the inventive concept. Moreover, all the details of the invention may be substituted for technically equivalent elements.

What is claimed is:

1. A machine for a thermal treatment and production of liquid and semi-liquid food products, comprising:

at least two containers for containing respective products to be subjected to the thermal treatment, at least one dispenser for dispensing the product contained in said containers, thermal treatment means operatively acting on the products contained in the containers, wherein the thermal treatment means comprise at least one circuit for circulation of an operating fluid and at least two first heat exchangers operating according to a thermodynamic cycle; each of the two first heat exchangers being associated with a respective container; said thermal treatment means being configured so that one of said exchangers heats a contents of at least one of said containers, for producing a first liquid or semi-liquid food product, and the other of said exchangers cools a contents of the other of said containers, for producing a second liquid or semi-liquid food product, wherein said thermal treatment means is configured to remove heat from a respective container by means of one first heat exchanger and to simultaneously transfer heat to the respective other container by means of the other first heat exchanger, wherein the machine comprises a compressor whose delivery terminal is connected to one first heat exchanger and whose return terminal is connected to the other first heat exchanger, and a throttling valve interposed between the two first heat exchangers, wherein the machine comprises a switching valve, interposed between the two first heat exchangers, and a by-pass branch, interposed between the switching valve and the compressor, wherein the switching valve is positioned downstream of the first heat exchanger which is connected to the delivery terminal of the compressor and is positioned upstream of the throttling valve, wherein the switching valve can assume a first position where the by-pass branch is closed and the connection between the two first heat exchangers is open, and a second position where the by-pass branch is open and the connection between the two first heat exchangers is closed, wherein the machine is configured so that when the switching valve assumes the first position, the first heat exchanger that is located downstream of the compressor and is connected to the delivery terminal of the compressor cools the fluid circulating in the circuit to heat the product in the respective tank, and the first heat exchanger that is located upstream of the compressor, that is connected to the return terminal of the compressor, heats the fluid circulating in the circuit to cool the product in the respective tank, wherein the machine is configured so that when the switching valve assumes the second position, the throttling valve and the first heat exchanger that is located downstream of the throttling valve are cut off from fluid circulation while the first heat exchanger that is connected to the delivery terminal of the compressor has fluid flowing through it and transfers heat to the respective tank, thereby heating the product contained therein, wherein the machine is configured so that when the switching valve assumes the second position, the fluid circulating in the circuit is heated at the compressor where heat is generated by operation of the compressor, and heat is transferred to the products in the tank associated with the first heat exchanger connected to the delivery terminal of the compressor.

2. The machine according to claim 1, wherein the switching valve can be controlled by the operator for changing the configuration of the operating fluid circulation circuit.

3. The machine according to claim 1, comprising at least two operating fluid circulation circuits, a first and a second operating fluid circulation circuit, which are separate and independent, in which the first heat exchangers are respectively integrated.

4. The machine according to claim 3, wherein each operating fluid circulation circuit comprises a compressor, a said first heat exchanger, a second heat exchanger, and a throttling valve, operating according to a thermodynamic cycle; and wherein, in one of the operating fluid circulation circuits, the first heat exchanger acts as a condenser and the second heat exchanger acts as an evaporator, whilst in the other operating fluid circulation circuit the first heat exchanger acts as an evaporator and the second heat exchanger acts as a condenser.

5. The machine according to claim 3, wherein each operating fluid circulation circuit comprises a compressor, a said first heat exchanger, a second heat exchanger, and a throttling valve, operating according to a thermodynamic cycle; and wherein each operating fluid circulation circuit further comprises a switching valve, which is positioned downstream of the delivery terminal of the compressor and whose output is connected both to the second heat exchanger, at a first switching position of it, and to a node interposed between the throttling valve and the first heat exchanger, at a second switching position of it; the connection between the switching valve and the node being made by a by-pass branch.

6. The machine according to claim 5, wherein the switching valve can be controlled by the operator for changing the configuration of the operating fluid circulation circuit.

7. The machine according to claim 3, wherein each operating fluid circulation circuit comprises a compressor, a said first heat exchanger, a second heat exchanger, and a throttling valve, operating according to a thermodynamic cycle; and wherein each fluid circulation circuit further comprises a valve for inversion of the thermodynamic cycle between a first configuration, in which the first heat exchanger acts as an evaporator and the second heat exchanger acts as a condenser, and a second configuration, in which the first heat exchanger acts as a condenser and the second heat exchanger acts as an evaporator.

8. The machine according to claim 7, wherein the cycle inversion valve can be controlled by the operator.

9. The machine according to claim 3, comprising a first tank and a first cylinder which are connected to one another, provided with respective exchangers integrated in the first operating fluid circulation circuit and also comprising a second tank and a second cylinder which are connected to one another, provided with respective exchangers integrated in the second fluid circulation circuit.

10. The machine according to claim 9, wherein each fluid circulation circuit comprises switching means, configured to make the fluid circulate alternatively in the tank, in a first operating mode, or in the cylinder, in a second operating mode, so as to thermally treat the product in the tank or in the cylinder.

11. The machine according to claim 9, wherein the fluid circulation plant is configured to carry out, in the first operating mode, a hot gas thermal cycle.

12. The machine according to claim 1, wherein the operating fluid circulation circuit is configured to allow an inversion of the direction of movement of the operating fluid, to allow heating of one of said containers when the fluid is moved in a first direction and to allow cooling of said one of said containers when the fluid is moved in a second direction which is opposite to the first.

13. A method for a thermal treatment of liquid and semi-liquid food products for making at least a first and a second liquid or semi-liquid food product, comprising the steps of:

providing at least two containers for containing respective liquid- or semi-liquid-base products to be subject to the thermal treatment, providing thermal treatment means comprising at least one circuit for circulation of an operating fluid and at least two first heat exchangers operating according to a thermodynamic cycle; each of the two first heat exchangers being associated with a respective container, providing a compressor whose delivery terminal is connected to one first heat exchanger and whose return terminal is connected to the other first heat exchanger, and a throttling valve interposed between the two first heat exchangers, providing a switching valve, interposed between the two first heat exchangers, and a by-pass branch, interposed between the switching valve and the compressor, said switching valve being positioned downstream of the first heat exchanger which is connected to the delivery terminal of the compressor and being positioned upstream of the throttling valve, switching the switching valve to a first position where the by-pass branch is closed and the connection between the two first heat exchangers is open so that the first heat exchanger located downstream of the compressor, that is connected to the delivery terminal of the compressor, cools the fluid circulating in the circuit to heat the product in the respective tank, and so that the first heat exchanger located upstream of the compressor, that is connected to the return terminal of the compressor, heats the fluid circulating in the circuit to cool the product in the respective tank, and switching the switching valve to a second position where the by-pass branch is open and the connection between the two first heat exchangers is closed, so that the throttling valve and the first heat exchanger which is located downstream of the throttling valve are cut off from fluid circulation while the first heat exchanger which is connected to the delivery terminal of the compressor has fluid flowing through it and transfers heat to the respective tank, thereby heating the product contained therein, wherein when the switching valve assumes the second position, the fluid circulating in the circuit is heated at the compressor where heat is generated by operation of the compressor, and heat is transferred to the products in the tank associated with the first heat exchanger connected to the delivery terminal of the compressor.

* * * * *